United States Patent [19]

Psaltis et al.

[11] Patent Number: 5,111,445
[45] Date of Patent: May 5, 1992

[54] HOLOGRAPHIC INFORMATION STORAGE SYSTEM

[75] Inventors: Demetri Psaltis; Alan Yamamura, both of Pasadena, Calif.; Seiji Kobayashi, Tokyo, Japan

[73] Assignee: Sony Corporation, Tokyo, Japan

[21] Appl. No.: 438,576

[22] Filed: Nov. 17, 1989

[51] Int. Cl.$^5$ ............................ G11B 7/18; G11B 7/12
[52] U.S. Cl. .................................. 369/103; 356/121; 359/25; 359/29
[58] Field of Search .................. 369/103, 44.17, 44.18, 369/58, 177, 109, 111; 250/201.1, 221, 201.2, 201.9; 350/3.6, 3.8, 3.78, 3.79, 3.5, 3.82; 356/121, 125, 235, 216

[56] References Cited

U.S. PATENT DOCUMENTS

| | | | |
|---|---|---|---|
| 4,005,260 | 1/1977 | Janssen | 369/44.17 |
| 4,021,606 | 5/1977 | Takeda et al. | 369/103 |
| 4,025,731 | 5/1977 | Dembault | 369/103 |
| 4,094,011 | 6/1978 | Nagao | 350/3.82 |
| 4,224,480 | 9/1980 | Satoh et al. | 369/103 |
| 4,260,858 | 4/1981 | Beiser | 369/103 |

OTHER PUBLICATIONS

T. Tsunoda, K. Tatsuno, K. Kataoka, and Y. Takeda, "Holographic video disk: an alternative approach to optical video disks", *Applied Optics*, vol. 15, No. 6, Jun. 1976, pp. 1398-1403.

A. L. Mikaelyan, A. F. Manin, E. Kh. Gulanyan, and S. A. Prokopenko, "Holographic disk for data storage", *Sov. J. Quantum Electron*, vol. 17, No. 5, May 1987, pp. 680-687.

W. F. Heagerty, "Ideographic Composing Machine," *Applied Optics*, vol. 9, No. 10, Oct. 1970, pp. 2291-2294.

Isao Satoh and Makoto Kato, "Holographic disk recording of digital data with fringe stabilization", *Applied Optics*, vol. 27, No. 14, Jul. 15, 1988, pp. 2987-2992.

Toyohiko Yatagai, Jose G. Camacho-Basilo, and Hajime Onda, "Recording of Computer Generated Holograms on an Optical Disk Master," *Proceedings of the SPIE*, vol. 1052, No. 16, pp. 199-124, 1989.

Demetri Psaltis, Alan A. Yamamura, Mark A. Neifeld, and Seiji Kobayashi, "Parallel Readout of Optical Disks"; Demetri Psaltis, Mark A. Neifeld, and Alan Yamamura, "Optical Disk Based Correlation Architectures," presented at the Third Topical Meeting on Optical* Newspaper Article released from the ASAHI Newspaper, Oct. 11, 1989, regarding a study by Seiji Kobayashi of Sony.

Demetri Psaltis, Mark A. Neifeld, Alan A. Yamamura, and Seiji Kobayashi, "Holographic Recording on Optical Disks," paper presented at International Symposium on Optical Memory, Kobe, Japan, Sep. 26-28, 1989.

*Primary Examiner*—Roy N. Envall, Jr.
*Assistant Examiner*—Thang V. Tran
*Attorney, Agent, or Firm*—Limbach & Limbach

[57] ABSTRACT

An optical system for reading a plurality of radially contiguous individual holograms previously recorded on a rotatable disk along at least one of the disk tracks, each hologram being representative of a predetermined data pattern, and each being recorded as a Fourier transform hologram with respect tot the direction (y direction) tangential to the tracks and as a Fresnel hologram with respect to the radial direction (x direction), and wherein the optical system illuminates the disk with a read-out beam which is at least partially reflected by the disk to an array of photosensitive detectors which generates electrical data signals. A latch circuit is included for recovering the value of each data signal when the read-out beam completely illuminates one of the holograms.

28 Claims, 7 Drawing Sheets

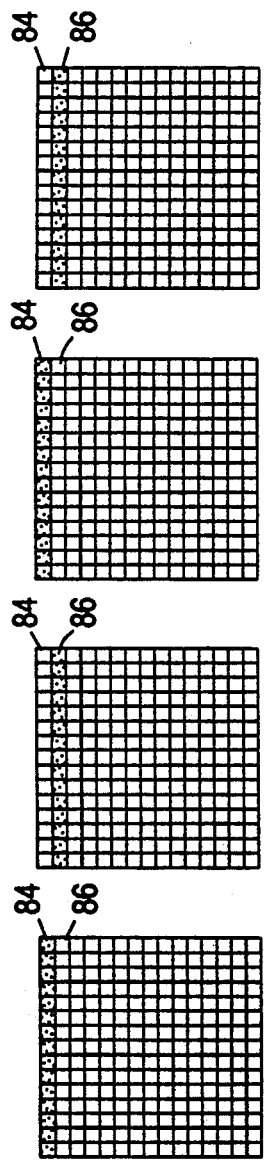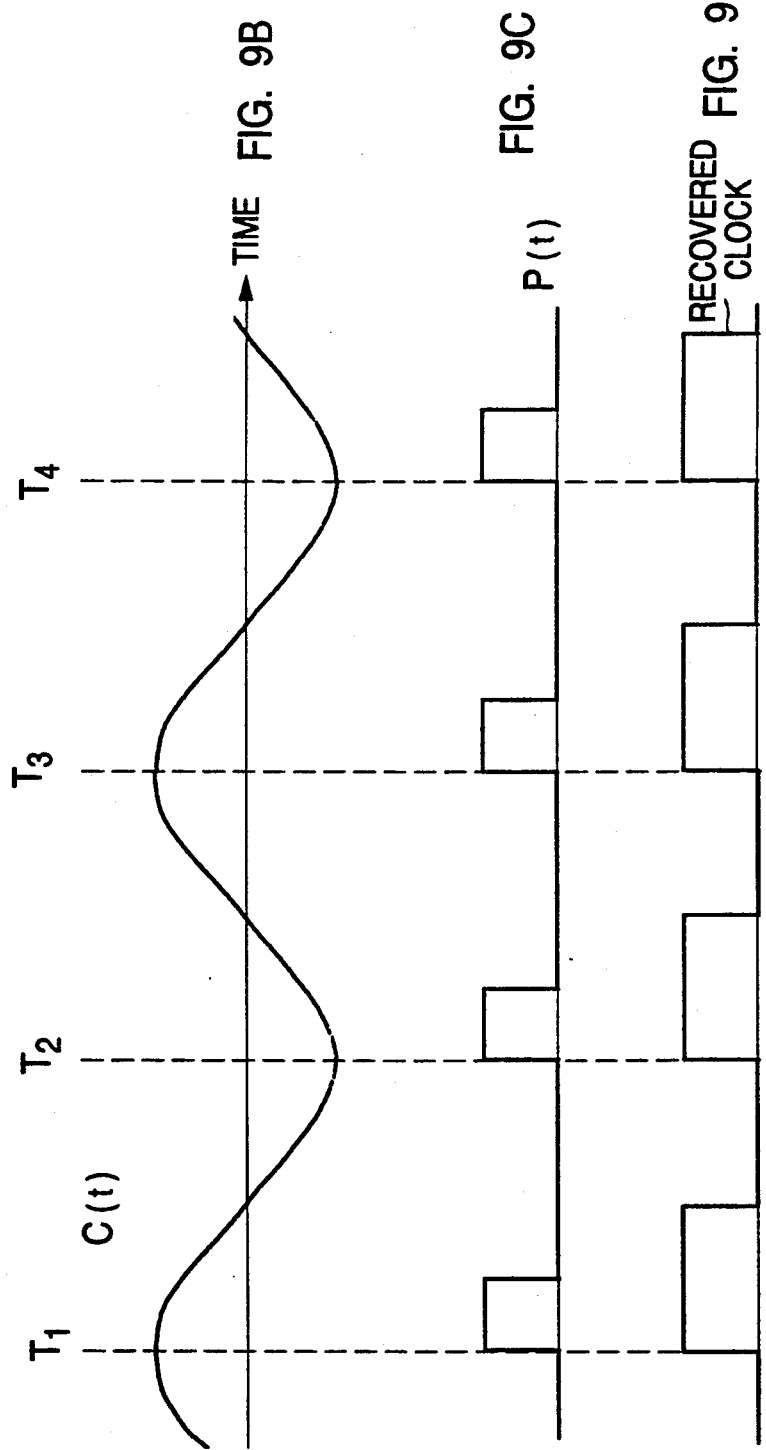

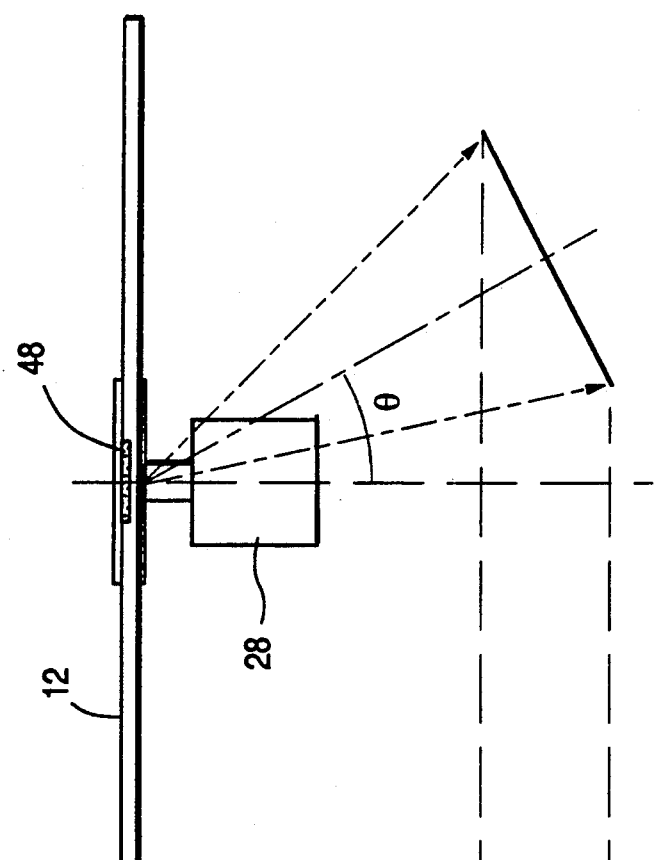
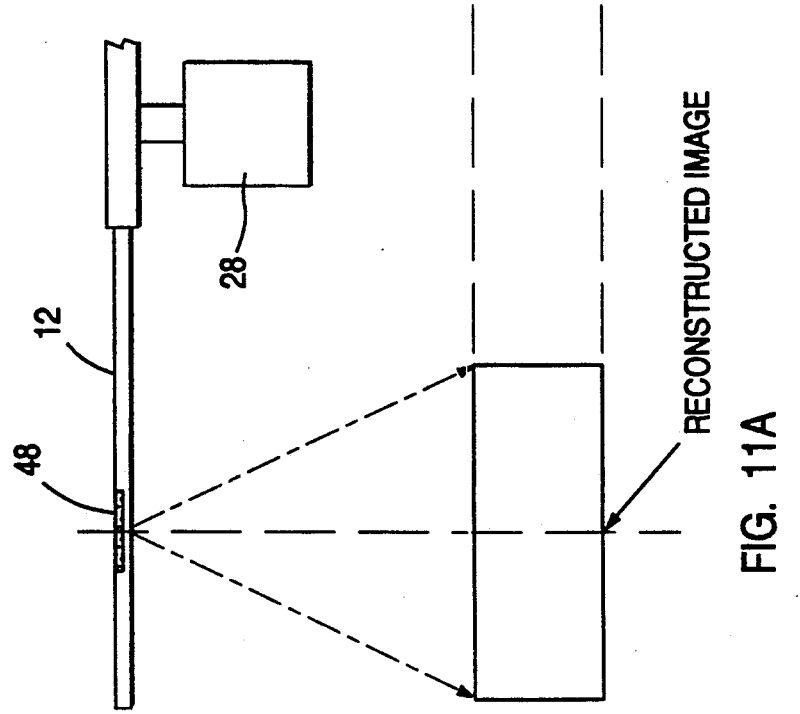
FIG. 11B
FIG. 11A

HOLOGRAPHIC INFORMATION STORAGE SYSTEM

BACKGROUND OF THE INVENTION

1. Field of the Invention

The present invention relates to optical information storage systems. In particular, the present invention relates to the holographic storage and retrieval of such information using optical disks.

2. Description of the Related Art

Optical memory disks have recently been developed as mass storage media in a number of audio-video and computer memory applications. In conventional systems the information stored on the optical disk is recorded and read out serially by focusing a laser beam on a single pixel with the aid of a lens. Unfortunately, this serial mode of data transfer limits the maximum operating speed of computers utilizing optical memory. Moreover, complex servo-mechanisms are typically required to keep the distance between the lens and disk constant to within approximately 1 $\mu$m. as the disk rotates. As a result, the response time of the servo mechanism also effectively limits the maximum data transfer rate by limiting the angular velocity at which the disk can be rotated.

The optics included in conventional optical memory architectures also constrain the amount of information which can be stored on the optical disk. That is, the information storage density on the surface of the optical disk is limited by the resolution of the optical read-out system. Ideally, the maximum storage density would be limited only by the minimum dimensions recordable on the optical disk itself.

Hence, a need in the art exists for an optical information storage system not limited by serial-mode data transfer, and which can retrieve information without the aid of focusing optics.

SUMMARY OF THE INVENTION

The need in the art for an optical information storage system without the limitations mentioned above is addressed by the holographic, parallel readout information storage system of the present invention. A holograhic, parallel read-out information storage system comprising:

an optical memory disk having a plurality of coaxial tracks, each of which includes a plurality of substantially evenly-spa ed prerecorded data pixels which form a plurality of radially contiguous individual holograms, each hologram being representative of a predetermined data pattern, positioned along the track;

means for rotating the optical memory disk about an axis;

means for illuminating the optical memory disk with a read-out beam, the read-out beam being at least partially reflected from the optical memory disk;

means for detecting the reflected read-out beam, the detecting means including an array of photosensitive detector pixels for generating corresponding electrical data signals; and means for latching the data signals when the read-out beam illuminates one o the holograms, the latching occurring when the reflected read-out beam projects a complete image o the hologram under illumination onto the array of detector pixels.

In a preferred embodiment, each hologram is positioned along a least one of the tracks and each of the radially continuous holograms is recorded as a Fourier transform hologram with respect to the direction (y direction) tangential to the backs and as a Fresnel hologram with respect to the radial direction (x direction), i.e. perpendicular to the tangential direction o the tracks.

Further, in the preference embodiment, the recording means further includes:

means for calculating the complex electric field on the surface of the optical memory disk for each hologram to be recorded given the desired a value of the complex electric fields existing at the detector pixel array;

means for grouping sets of the data pixels along each of the tracks into super pixels;

means for assigning each data pixel within each of the superpixles an electric field angle such that each of the superpixels may represent a plurality of electric field angles; and wherein he optical system illuminates the data pixels of each superpixel such that each superpixel approximately represents the calculated electric field angle at the location on the optical memory disk occupied by the superpixel.

BRIEF DESCRIPTION OF THE DRAWINGS

FIGS. 9A, 9B, 9C and 9D are timing diagrams showing the relationship between the detector array, the clock recovery signal and the clock signal derived therefrom.

FIGS. 11A and 11B are vertical, side diagrams for use in explaining the problem of image plane tilting.

DETAILED DESCRIPTION OF THE INVENTION

Figure 1:
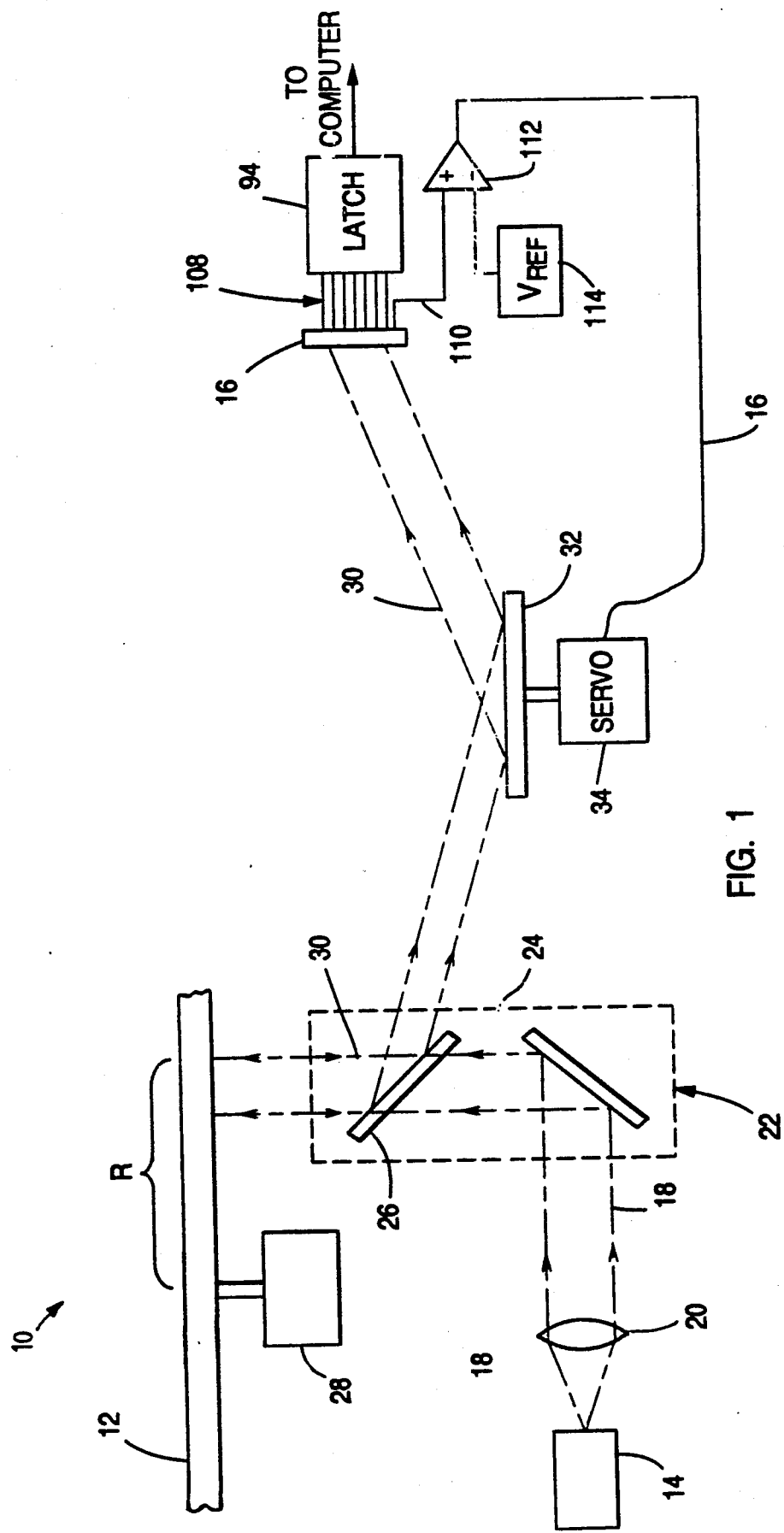
FIG. 1 shows a side view, schematic representation of a preferred embodiment of the holographic information storage system of the present invention.

FIG. 1 shows a schematic representation of a preferred embodiment of the information storage and readout system 10 of the present invention. As will be described more fully below, in this mode holograms previously stored on an optical disk 12 are illuminated by a laser 14. Each hologram on the disk 12 embodies a representation of a known data pattern. Illumination of each hologram generates a reflected image wavefront 30 which, when projected on a detector array 16, yields a data pattern substantially similar to that represented by the particular hologram under illumination.

In the embodiment of FIG. 1, the laser 14 emits a coherent read-out beam 18 which is (collimated) by a lens 20. The beam 18 is of the same wavelength as the reference beam originally used to write the holograms stored on the disk 12. A scanning apparatus 22 directs the beam 18 to illuminate a portion of the disk 12 located a distance R from the center thereof. The apparatus 22 includes a mirror 24 and a beam splitter 26. The scanning apparatus 22 can be controlled by conventional means to vary the radial coordinate R of the location on the disk 12 illuminated by the beam 18. Other holograms also located a distance R from the center of the disk 12 are illuminated by rotating the disk 12 with a drive mechanism 28.

The component 30 of the beam 18 reflected by the disk 12 is directed by the beam splitter 26 to a controllable mirror 32. As is described below, a servo mechanism 34 adjusts the orientation of the mirror 32, e.g. tilts it, such that the beam 30 continues to illuminate the detector 16. The detector 16 includes an array of photosensitive detector pixels for detecting the beam 30.

Figure 2:
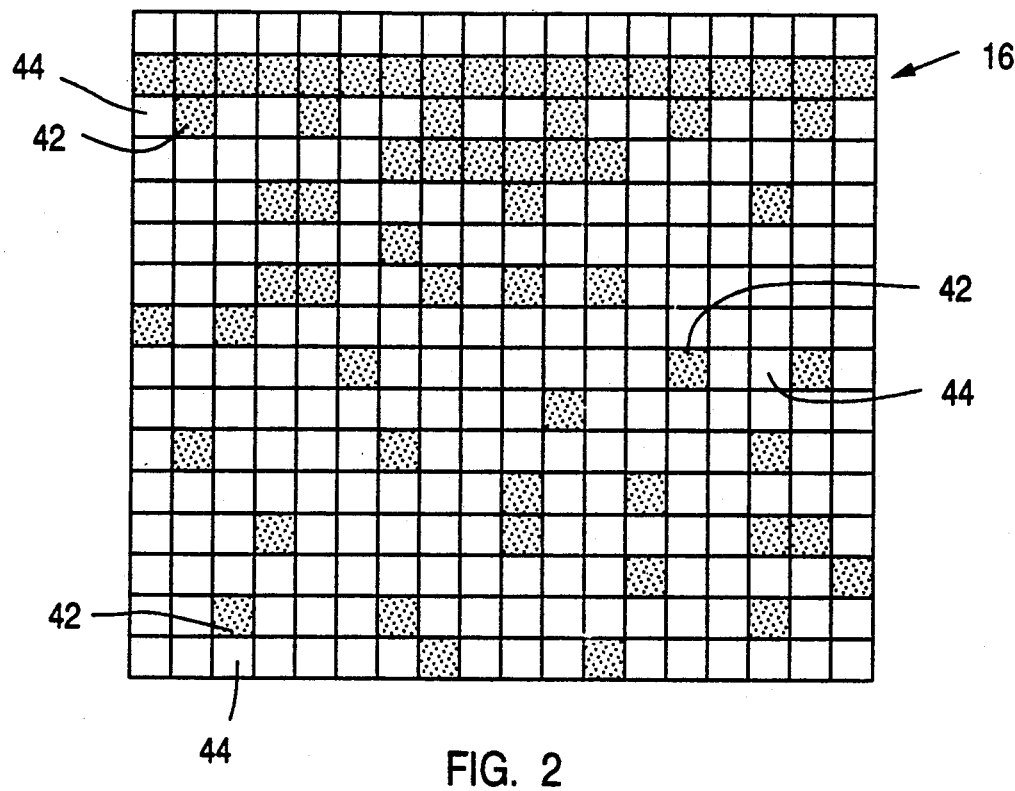
FIG. 2 depicts an enlarged front view of the detector included within the information storage system of the present invention.

FIG. 2 depicts a typical front view of the detector 16 as it might appear under illumination by the beam 30 while reading a particular hologram. Spatial variation in the electromagnetic fields of the beam 30, engendered by the particular hologram under illumination on the disk 12, induce certain pixels 42 (shaded) to generate an electrical signal while the remainder of the pixels 44 are not actuated. The pixels 42, 44 are actuated upon receipt of electromagnetic radiation in excess of a predetermined threshold value. The pixel pattern of FIG. 2 corresponds to binary data stored as a hologram on the disk 12 which has been previously transferred to the detector 16 via the beam 30.

Figure 3:
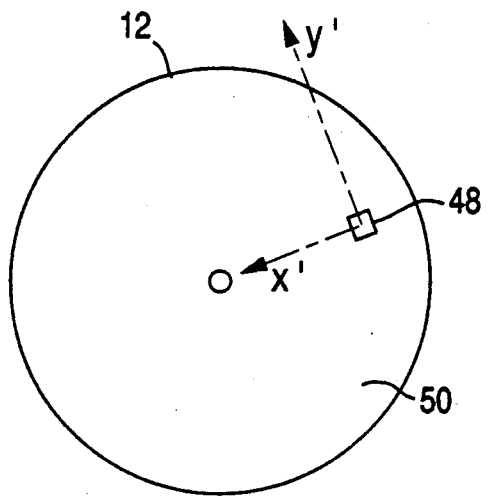
FIG. 3 is an illustrative representation of a hologram stored on the optical disk included within the system of the present invention.
Figure 4:
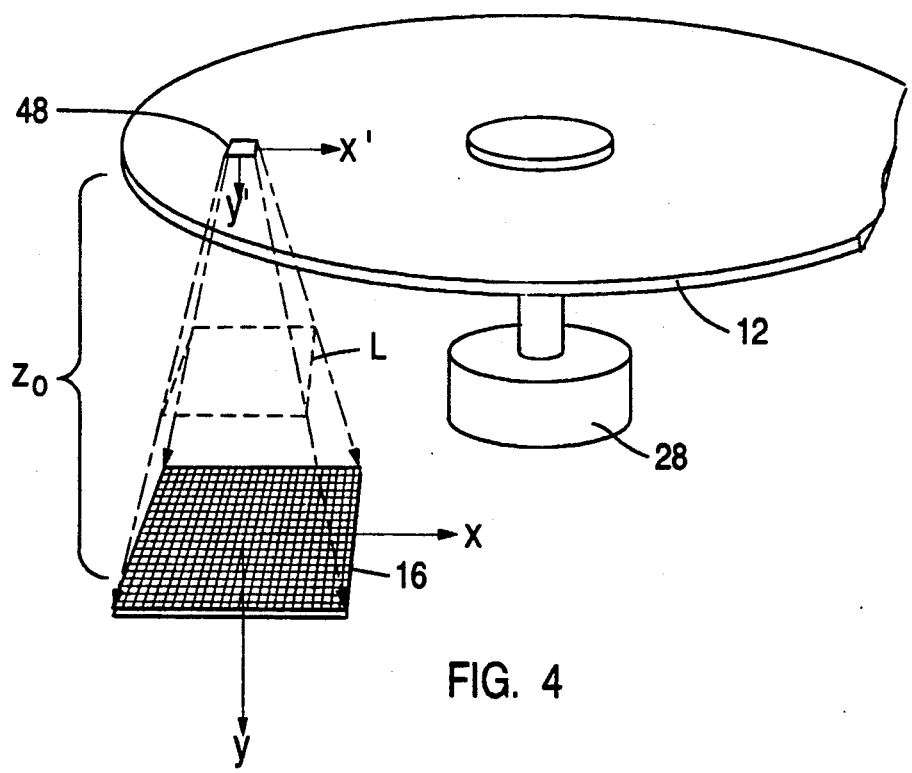
FIG. 4 is a diagram showing the relationship between the coordinate systems of the optical disk and the detector array.

In a preferred embodiment of the present invention a hologram on the disk 12 representative of a two dimensional array of binary information, such as that exemplified in FIG. 2, is recorded as a Fresnel hologram in a first direction and as a Fourier transform hologram in a second direction orthogonal to the first direction. In particular, FIG. 3 illustratively represents a hologram 48 stored on a planar surface 50 of the disk 12. The hologram 48 is recorded as a Fresnel hologram in the x' (i.e. the radial) direction and as a Fourier transform hologram in the y' (i.e. the circumferential) direction. Given that g(x,y) corresponds to a complex electric field amplitude of the beam 30 at the surface of the detector 16 which will produce a pixel pattern such as that shown in FIG. 2, the corresponding complex electric field amplitude E(x',y') at the surface of the disk 12 inducing such a pattern is given by:

$$E(x', y') = \int_{-\infty}^{\infty} \int g(x, y) \exp\{j(\pi/\lambda Z_0)[-2yy' + (x - x')^2]\} dx dy \quad (1)$$

wherein $\lambda$ is the wavelength of the beam 30. In addition, the relationship of the (x,y) and (x',y') coordinate systems and the distance $Z_0$ separating the respective origins thereof, i.e. the distance between the hologram and the detectors, are shown in FIG. 4.

Fourier transform holograms are known to possess the characteristic of shift invariance. That is, rotation of the disk 12 does not impede detection of the reconstructed image carried by the beam 30. If the area of the detector 16 is chosen to be substantially larger than that of the hologram 48, a lens does not need to be incorporated into the system 10 to focus the beam 30 in the focal plane occupied by the detector 16. However, the absence of a lens L removes the shift invariance advantage. Otherwise a cylindrical lens L should be positioned between the detector array 16 and the hologram 48. It is therefore a feature of the present invention that the maximum angular velocity of the disk 12, and hence the data transfer rate of the system 10, is not limited by the response time of auxiliary compensation circuitry.

Figure 5:
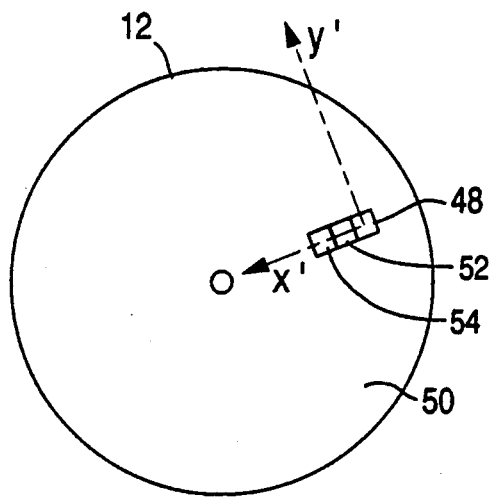
FIG. 5 is an illustrative representation of three contiguous holograms on the surface of the optical disk included within the system of the present invention.

FIG. 5 illustratively represents the hologram 48 and radially adjacent holograms 52, 54 recorded on the surface 50 of the disk 12. Holograms 52, 54 also were recorded as Fourier transform and Fresnel holograms in directions y' and x', respectively. As is evident upon inspection of FIG. 5, rotation of the disk 12 in the direction y' does not affect the spatial relationship between adjacent holograms 48 and 52 or between adjacent holograms 52 and 54. Accordingly, the holograms 48, 52 and 54 are synthesized in the x' direction as Fresnel holograms to minimize interference from neighboring, radially contiguous holograms.

Figure 6:
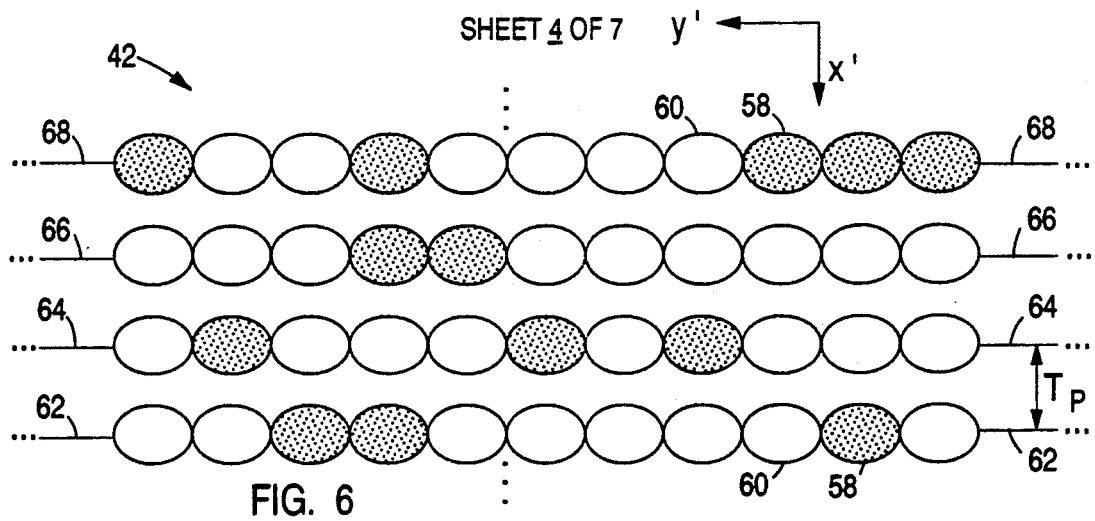
FIG. 6 is an enlarged top view of a portion of a hologram recorded on the surface of the optical disk.

The hologram 48 is recorded on the surface 50 of the disk 12 in the form of a two dimensional grid of data. In particular, FIG. 6 shows an enlarged, radially outer edge view of a portion of the hologram 48. The hologram 48 includes a plurality of data pixels 58, 60 arranged along disk tracks 62, 64, 66 and 68. The pixels 58 are realized by conventionally inscribing a pit on the surface of the disk 12 which alters the reflectivity thereof. Conversely, the logical opposite of the value represented by the pixels 58 is stored in the pixels 60 wherein the inherent reflectivity of the pixel has not been modified. The tracks 62, 64, 66 and 68 encircle the center of the disk 12. In addition, the distance between adjacent tracks (track pitch) is denoted by $T_p$. Thus, in the preferred embodiment the disk 12 comprises a write-once disk with data pixels arranged uniformly along the disk tracks and aligned across tracks in the x' direction.

The SONY Corporation of Tokyo, Japan has developed a disk which embodies the attributes of the disk 12 enumerated above. See D. Psaltis, et. al; *Parallel Readout of Optical Disks;* presented at the Third Topical Meeting on Optical Computing, Salt Lake City, Utah; Feb. 1989 (see FIG. 2b). The SONY disk includes 1 $\mu$m diameter data pixels, the center to center spacing between pixels along disk tracks is 0.5 to 1 $\mu$m and the track pitch is 1.5 $\mu$m. At this recording density in excess of 3.6 billion bits can be recorded on a 12 cm diameter optical disk.

Figure 7A:
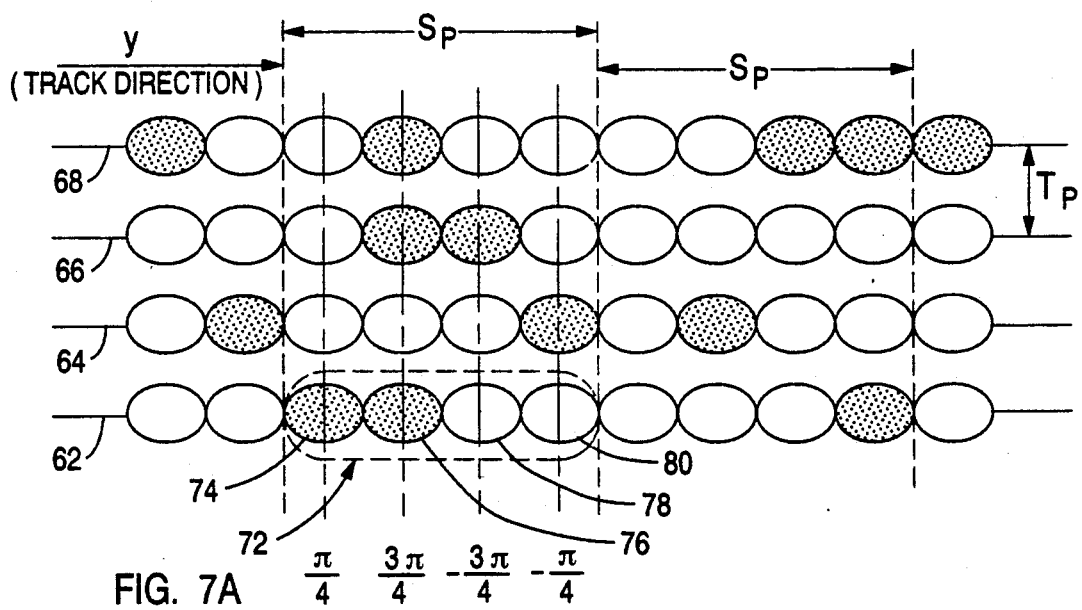
FIG. 7A is a diagram which shows the grouping of data pixels into superpixels within the portion of the hologram shown in FIG. 6.
Figure 7B:
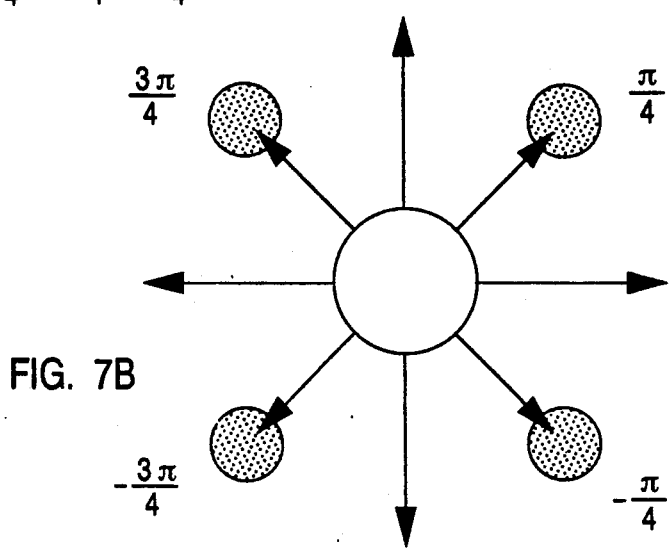
FIG. 7B is vector diagram for use in explaining the recording of the holograms depicted in FIG. 7A.

As shown in FIG. 7A, each of four pits, e.g. 74, 76, 78 and 80, along a track 62 can be combined into one superpixel 72. A unit vector having an angle of $\pi/4$ $3\pi/4$, $-3\pi/4$, or $-\pi/4$ can be recorded by choosing one of these pits. Furthermore, any combination of these pits can describe four more vectors as shown in FIG. 7B. As a result, nine vectors (including a zero vector) can be recorded on the disk 12. After the complex field E(x',y') at the surface 50 of the disk 12 (i.e. the complex electric field at the position (x',y') within the hologram 48) is calculated according to equation (1) with the aid of a computer, then the closest vector shown in FIG. 7B is chosen and recorded on the disk surface 50.

However, as illustrated in FIGS. 11A and 11B, this mode of recording the field $E(x',y')$ causes the image plane of the beam 30 to be tilted with respect the y direction by an angle $\Theta$, where $$\Theta = \sin^{-1}(\lambda/S_p).$$

As shown in FIG. 7A, $S_p$ is the length of the superpixel 72 and $\lambda$ is the wavelength of the beam 30. Hence, the plane of the detector 16 should be adjusted by an angle $\theta$ relative to the normal to the disk 12 to attain optimal reception of the reconstructed holographic image. In addition, the size of the data pixels in the x' and y' directions, $\Delta x$ and $\Delta y$, are given by $$\Delta x = (1/N_x)(\lambda Z_o/T_p)$$

$$\Delta y = (1/N_y)(\lambda Z_o/T_p)$$

where $N_x$ and $N_y$ are the number of data pixels encompassed by the hologram in the x' and y' directions, respectively.

Since each hologram written on the disk 12 includes a two dimensional array of data pixels, as the disk 12 rotates the beam 30 will periodically contain the complete, reconstructed image generated by the particular hologram under illumination by the read-out beam 18. During the intervening time intervals the read-out beam 30 will illuminate adjacent portions of holograms positioned contiguously along the tracks of the disk 12. Hence, it is desired to capture the wavefront impinging upon the detector 16 when the read-out beam 18 is centrally positioned over only one of the holograms on the disk 12. The manner in which the system 10 of the present invention facilitates this capture will be explained with reference to FIGS. 8 and 9.

Figure 8:
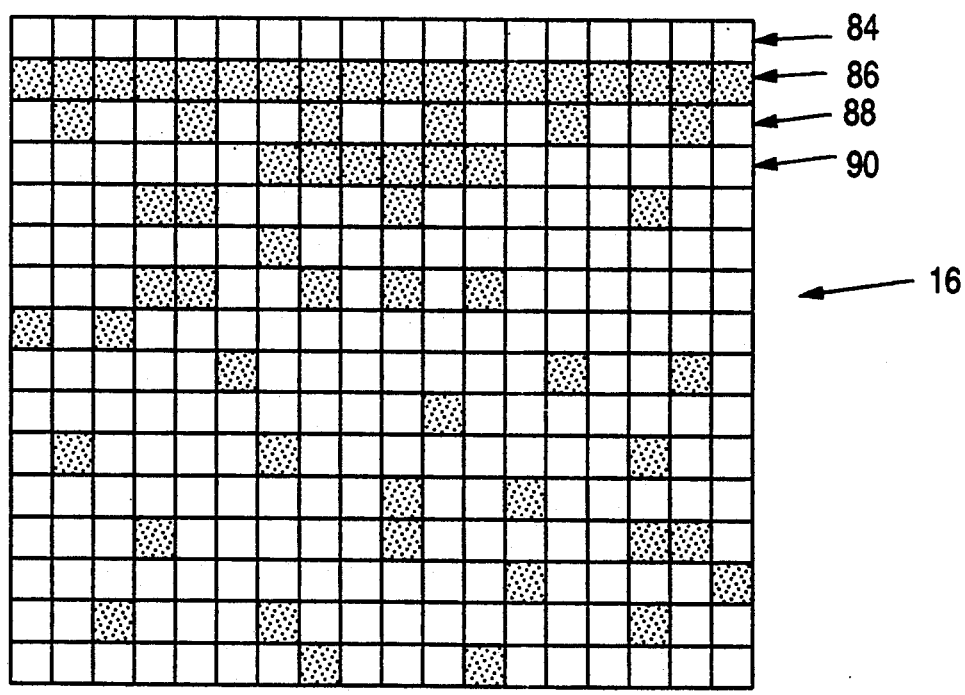
FIG. 8, is an illustrative example of a pixel pattern exhibited by the detector array upon illumination by the reflected portion of the readout beam.

FIG. 8 is an illustrative example of the pixel pattern exhibited by the detector 16 upon illumination by the beam 30. The uppermost (as viewed in the figure, actually the radially outermost) four rows of detector pixels 84, 86, 88, 90 are dedicated to recovery of several control signals. The clock recovery control signal, C(t), is generated by taking the difference between the summed output of pixels in the first detector row 84 and the second detector row 86. As shown in FIG. 9, the amplitude of C(t) will be at a maximum when all of the detector pixels in one or the other of rows 84 and 86 are actuated. Clock recovery control signal data is stored on the disk 12 such that adjacent holograms will alternately induce either the entire detector pixel row 84 or row 86 to become actuated. It follows that the signal C(t) will be at a maximum when the beam 18 is centered over only one of the holograms on the disk 12, and does not partially illuminate neighboring holograms. As shown in FIG. 9 these extreme occur at times $T_1$, $T_2$, $T_3$ and $T_4$, and these are the times at which it is desired to latch the output of the detector 16.

Figure 10:
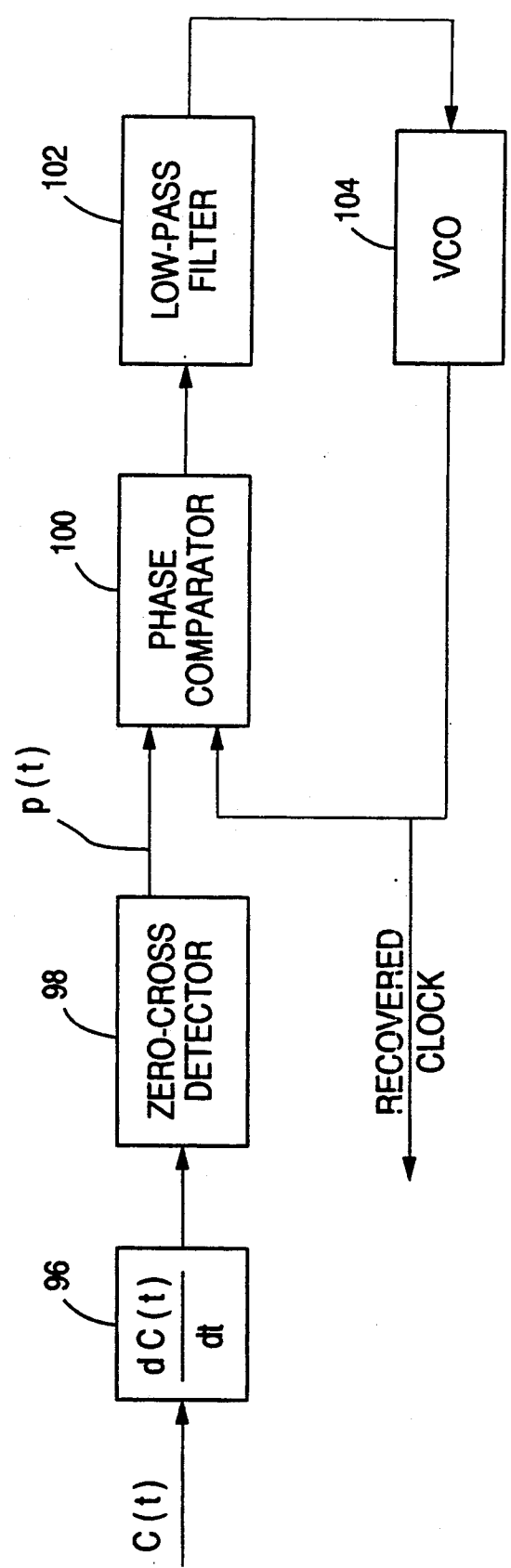
FIG. 10 is a block diagram of a second order phase locked loop utilized in a particular embodiment of the latch included within the present invention.

A conventional peak detection circuit can be used to generate a peak detection waveform p(t) shown in FIG. 9 in response to the clock recovery signal C(t). Further, those skilled in the art can derive a clock signal from the peak detection signal p(t) using conventional means. As shown in FIG. 1, the peak detection circuit and circuitry for generating a clock signal in response to the output thereof are included within a latch 94. Alternatively, the latch 94 can include a second order phase-locked loop, such as that depicted in the block diagram of FIG. 10, to recover a clock signal from the output of the detector 16. As shown in FIG. 10 the signal C(t) of FIG. 9, synthesized from the difference of the summed outputs of the detector rows 84 and 86, is input to a differentiator 96. Sign changes in the output of the differentiator 96 are sensed by a zero crossing detector 98, which emits the waveform p(t) of FIG. 9. The phase locked loop of FIG. 10 further includes a phase comparator 100, low pass filter 102 and voltage controlled oscillator 104 for recovering a clock signal from the waveform p(t).

In order to minimize interference from adjacent holograms on the disk 12, the output of the detector array 16 should be collected on the rising edge of the recovered clock signal of FIG. 9. This collection is facilitated by transmission lines 108 which electrically couple pixels included within the detector 16 to the latch 94. The latch 94 further includes interface circuitry for transmitting data collected from the detector 16 to a computer or system controller (not shown).

As shown in FIG. 8, the pixel pattern of the third row 88 of the detector 16 is periodic. In the preferred embodiment of FIG. 1 each of the holograms on the disk 12 are formulated to induce the identical output for the third detector row 88. Hence, the time-averaged output of the third row of the detector should be constant provided that the beam 30 remains focused on the detector 16. The time-averaged output of the third detector row 88 is carried by a signal line 110 to a comparator 112 where it is compared with a reference voltage 114 (Vref). When the beam 30 strays from the detector 16 the signal level from the third detector row 88 will change and the output voltage of the comparator 112 will be altered. This change is communicated to the servo mechanism 34 via a transmission line 116 and the mirror 32 is repositioned to refocus the beam 30 onto the detector array 16. Through this feedback action the beam 30 remains focused upon the detector 16 despite translation of the scanning apparatus 22.

Those having ordinary skill in the art and access to the teachings of the present invention will recognize additional modifications and applications within the scope thereof. For example, arrangements of scanning optics other than that described above can be utilized to illuminate the optical disk. Similarly, the invention is not limited to particular embodiments of the latch circuit or controllable mirror compensation network disclosed herein. For example, those skilled in the art may be aware of other circuits for recovering a clock signal from the clock recovery signal generated by the detector array which would be suitable for inclusion in alternative embodiments of the present invention.

Thus, while the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. It is therefore contemplated by the appended claims to cover any and all such modifications.

Accordingly, what is claimed is:

1. A holograhic, parallel read-out information storage system comprising:

an optical memory disk on which are previously recorded a plurality of coaxial tracks and a plurality of radially contiguous individual holograms, each hologram being representative of a predetermined data pattern and positioned along at least one of the tracks, wherein each of the radially contiguous holograms is recorded as a Fourier transform hologram with respect to the direction (y direction) tangential to the tracks and as a Fresnel hologram with respect to the radial direction (x direction), i.e. perpendicular to the tangential direction of the tracks;

means for rotating the optical memory disk about an axis;

an optical system for illuminating the optical memory disk with a read-out beam, the read-out beam being at least partially reflected from the optical memory disk;

detector means for detecting the reflected read-out beam, the detector means including an array of photosensitive detector pixels for generating corresponding electrical data signal; and latch means for latching he data signals when the read-out beam illuminates one of he holograms, the latching occurring when the reflected read-out beam projects a complete image of he hologram under illumination onto the array of detector pixels.

2. The system of claim 1 wherein the latch means sums the electrical outputs of a plurality of the detector pixels to generate a control signal.

3. The system of claim 1 wherein thelatch mans sums the electrical outputs of a fist row of the detector pixels included within the array.

4. The system of claim 3 wherein thelatch means sums the electrical outputs of a second row of the detector pixels included within that array.

5. The system of claim 4 wherein the latch means takes the difference between the sumed outputs of the first and second rows and generates an electrical control signal in response thereto.

6. The system of claim 5 wherein the latch means includes a peak detection circuit for comparing the amplitude of the control signal to a predetermined threshold value and generating a clock pulse when the amplitude of the control signal exceeds the predetermined threshold value.

7. The system of claim 6 wherein the latch means includes a clock regeneration circuit, the regeneration circuit comprising:
a differentiator responsive to the control signal;
a zero-crossing detector coupled to eh differentiator; and
a phase-locked loop circuit coupled to the zero-crossing detector for generating a recovered clock signal.

8. The system of claim 7 further including controllable mirror means for redirecting the reflected read-out beam to he detector means.

9. The system of claim 8 wherein the controllable mirror means comprises:
a position adjustable mirror in optical alignment with the reflected read-out beam;
a photo detection apparatus for generating a mirror control signal in response to the direct current component of the portion of the reflected read-out beam redirected by the adjustable mirror; and,
a servo mechanism for adjusting the position of the mirror in response to the mirror control signal.

10. The system of claim 1 wherein each of the tracks of the optical memory disk includes a plurality of substantially evenly-spaced data pixels.

11. The system of claim 1 further including a lens for focusing the reflected read-out beam on the detector means.

12. The system of claim 9 wherein the optical system for illuminating the optical memory disk includes a beam splitter and a coherent light source for generating the read-out beam in a direction perpendicular to the optical memory disk, the beam splitter being positioned in the optical path of the read-out beam in order to deflect the reflected read-out beam to the mirror.

13. The system of claim 1, wherein:
the plurality of radially contiguous individual holograms previously recorded on the optical memory disk are the result of calculating the complex electric field on eh surface of the optical memory disk for each hologram to be recorded even the desired value of the complex electric fields existing at the detector pixel array,
grouping sets of the data pixels along each of the racks into superpixels, and
assigning each data pixel within each of the superpixels an electric field angle such that each of the superpixels may represent a plurally of electric field angles; and
wherein the optical system illuminates the data pixels of each superpixel such that each superpixel approximately represents the calculated electric field angle at the location on the optical memory disk occupied by the superpixel.

14. The system of claim 13 wherein each of the previously recorded radially contiguous holograms is a Fourier transform hologram with respect to the direction tangential to the tracks.

15. The system of claim 14 wherein each of the previously recorded contiguous holograms is a Fresnel hologram with respect to the radial direction (x direction), i.e. perpendicular to the tangential direction of the tracks.

16. A holographic method of storage and parallel pretieval of recorded information comprising the steps of:
recording on an optical memory disk, in a plurally of coaxial tracks, a plurality of radially contiguous individual holograms, each hologram being representative of a predetermined data pattern and positioned along at least one of the tracks, wherein each of the radially contiguous holograms is recorded as a Fourier transform hologram with respect to the direction (y direction) tangential to the tracks and as a Fresnel hologram with respect to the radial direction (x direction), i.e. perpendicular of the tangential direction of the tracks;
rotating the optical memory disk about an axis;
illuminating the optical memory disk with a read-out beam, the read-out beam being at least partially reflected from the optical memory disk;
detecting the reflected readout beam by means of an array of photosensitive detector pixels and generating corresponding electrical data signals; and
latching he data signals when the read-out beam illuminates one of the holograms, the latching occurring when the reflected read-out beam projects a complete image of the hologram under illumination onto the array of detector pixels.

17. The method of claim 16 wherein he step of latching includes the step of summing the electrical outputs of a plurally of photo-detectors arranged in an array to generate a control signal.

18. The method of claim 17 wherein the step of latching includes the step of summing the electrical outputs of a first row of the photo-detectors included within the array.

19. The method of claim 18 wherein the step of latching includes the step of summing the electrical outputs of a second row of the photo-detectors included within the array.

20. The method of claim 19 wherein h step of latching includes the step of taking the difference between the summed outputs of the first and second rows to generate an electrical control signal in response thereto.

21. The method of claim 16 wherein the step of latching includes the steps of comparing the amplitude of the control signal to a predetermined threshold value and generating a clock pulse when the amplitude of the control signal exceeds the predetermined threshold value.

22. The method of claim 21 wherein he step of latching further includes the steps of:
a) differentiating the control signal;
b) detecting changes in sign of the derivative o the control signal; and
c) generating a recovered clock signal in response to the changes in sign of the derivative of the control signal.

23. The method of claim 16 further including the step of redirecting the reflected read-out beam to the array of photo-detectors.

24. The method of claim 23 wherein the step of directing further includes the step of adjusting the redirection of the reflected read-out beam in response to the direct current component of the redirected portion of the reflected read-out beam.

25. The method of claim 16 wherein search of the tracks includes a plurality of substantially evenly-spaced data pixels and the step of recording includes the steps of:
a) calculating the complex electric field on the surface of the optical memory disk for each hologram to be recorded given the desired value of the complex electric fields existing at the detector pixel array;
b) grouping sets of the data pixels along each of the tracks into superpixels;
c) assigning each data pixel within each of the superpixels an electric field angle such that each of the superpixels may represent a plurality of electric field angles;
d) illuminating the data pixels of each superpixel such that each superpixel approximately represents the calculated electric field angle at the location on the optical memory disk occupied by the superpixel.

26. A holographic method of storage and parallel retrieval of recorded information comprising:
recording on an optical memory disk a plurally of coaxial tracks, each of which includes a plurality of substantially evenly-spaced data pixels which form a plurality of radially contiguous individual holograms, each hologram being representative of a predetermined data pattern, positioned along the track;
rotating the optical memory disk about an axis;
illuminating the optical memory disk with a read-out beam, the read-out beam being at least partially reflected rom the optical memory disk;
detecting the reflected read-out beam by means of an array of photosensitive detector pixels for generating corresponding electrical data signals;
latching the data signals when the read-out beam illuminates one of the holograms, the latching occurring when the reflected read-out beam projects a complete image of the hologram under illumination onto the array of detector pixels;
wherein the recording steps further include the steps of:
calculating the complex electric field on the surface of the optical memory disk or each hologram to be recorded given he desired value of the complex electric fields existing at the detector pixel array;
grouping sets of the data pixels along each of the tracks into superpixels;
assigning each data pixel within each of the superpixels an electric field angle such that each of the superpixels may represent a plurality of electric field angles; and
wherein the illuminating step includes the step of illuminating the data pixels of each superpixel such that each superpixel approximately represents the calculated electric field angle at the location on the optical memory disk occupied by the superpixel.

27. The system of claim 26 wherein each of the radially contiguous holograms is recorded as a Fourier transform hologram with respect to the direction (y direction) tangential to the tracks.

28. The system of claim 27 wherein each of the contiguous hologram s si recorded as a Fresnel hologram with respect to the radial direction (x direction), i.e. perpendicular to the tangential direction of the tracks.

* * * * *

UNITED STATES PATENT AND TRADEMARK OFFICE
CERTIFICATE OF CORRECTION

PATENT NO. : 5,111,445

DATED : May 5, 1992

INVENTOR(S) : Demetri Psaltis; Alan Yamamura, both of Pasadena, Calif.; Seiji Kobayashi, Tokyo, Japan It is certified that error appears in the above - identified patent and that said Letters Patent is hereby corrected as shown below:

On the title page:

After [73] Assignee: change "Sony Corporation, Tokyo, Japan" to:

--Sony Corporation, Tokyo, Japan, and California Institute of Technology, Pasadena, Calif.--

Signed and Sealed this

Third Day of November, 1992

Attest:

DOUGLAS B. COMER

*Attesting Officer*  *Acting Commissioner of Patents and Trademarks*